(12) United States Patent
Wheeler et al.

(10) Patent No.: US 9,014,476 B2
(45) Date of Patent: *Apr. 21, 2015

(54) BACKGROUND SEPARATED IMAGES FOR PRINT AND ON-LINE USE

(71) Applicant: PC Connection, Inc., Merrimack, NH (US)

(72) Inventors: Matthew J. Wheeler, Amherst, NH (US); Steven R. Koontz, Raymond, NH (US); Robert C. Williams, Wilton, NH (US)

(73) Assignee: PC Connection, Inc., Merrimack, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,119

(22) Filed: Dec. 13, 2013

(65) Prior Publication Data

US 2014/0307160 A1 Oct. 16, 2014

Related U.S. Application Data

(63) Continuation of application No. 13/090,857, filed on Apr. 20, 2011, now Pat. No. 8,611,659, which is a continuation of application No. 11/850,083, filed on Sep. 5, 2007, now Pat. No. 7,953,277.

(60) Provisional application No. 60/824,571, filed on Sep. 5, 2006.

(51) Int. Cl.
*G06K 9/34* (2006.01)
*H04N 5/225* (2006.01)
(Continued)

(52) U.S. Cl.
CPC ............... *H04N 5/2256* (2013.01); *G06T 5/50* (2013.01); *G06T 7/0083* (2013.01); *G06T 2207/10012* (2013.01); *G06T 2207/20144* (2013.01); *H04N 1/3871* (2013.01); *H04N 1/6086* (2013.01)

(58) Field of Classification Search
USPC .............. 382/141, 143, 151–154, 305; 396/2; 362/8, 18, 11, 311.02
See application file for complete search history.

(56) References Cited

U.S. PATENT DOCUMENTS 3,643,085 A 2/1972 Durand
4,292,662 A 9/1981 Gasperini
(Continued)

FOREIGN PATENT DOCUMENTS

DE 102005005795 A1 8/2006

OTHER PUBLICATIONS

U.S. Appl. No. 11/850,064, Final Office Action mailed Aug. 19, 2010, 12 Pages.
(Continued)

*Primary Examiner* — Duy M Dang
(74) *Attorney, Agent, or Firm* — GTC Law Group LLP & Affiliates

(57) ABSTRACT

In embodiments of the present invention improved capabilities are described for producing background separated product images for print and on-line display. An image formation system provides lighting of a product to facilitate acquiring images that can be automatically processed to generate high resolution item-only images free of quality defects and imaging artifacts. Image processing programs accurately detect an outline of an item in a set of digital images taken using the image formation system and automatically store processed images in an image library. The images in the library may be repurposed for print, sales display, transmission to a user, on-line customer support, and the like. A user display configured with an adaptable user interface facilitates user interaction with images in the library.

20 Claims, 11 Drawing Sheets

(51) Int. Cl.
    *G06T 5/50*           (2006.01)
    *G06T 7/00*           (2006.01)
    *H04N 1/387*         (2006.01)
    *H04N 1/60*          (2006.01)

(56) References Cited

U.S. PATENT DOCUMENTS

| | | | |
|---|---|---|---|
| 5,778,258 A * | 7/1998 | Zamoyski | 396/2 |
| 6,106,124 A | 8/2000 | Tarsia | |
| 6,161,940 A | 12/2000 | Choate et al. | |
| 6,588,912 B1 | 7/2003 | Finn et al. | |
| 7,039,222 B2 | 5/2006 | Simon et al. | |
| 7,055,976 B2 | 6/2006 | Blanford | |
| 7,253,832 B2 | 8/2007 | Iwaki et al. | |
| 7,394,977 B2 | 7/2008 | Park et al. | |
| 7,460,130 B2 | 12/2008 | Salganicoff | |
| 7,502,036 B2 | 3/2009 | Kramer et al. | |
| 7,553,051 B2 | 6/2009 | Brass et al. | |
| 7,609,892 B2 | 10/2009 | Sato et al. | |
| 7,616,834 B2 | 11/2009 | Kramer et al. | |
| 7,630,088 B2 | 12/2009 | Iwasaki | |
| 7,659,938 B2 | 2/2010 | Lai | |
| 7,855,732 B2 | 12/2010 | Williams et al. | |
| 7,931,380 B2 | 4/2011 | Williams et al. | |
| 7,953,277 B2 | 5/2011 | Williams et al. | |
| 2001/0053284 A1 | 12/2001 | Shin | |
| 2002/0043632 A1 | 4/2002 | Miramonti et al. | |
| 2002/0063714 A1 | 5/2002 | Haas et al. | |
| 2002/0085219 A1 | 7/2002 | Ramamoorthy | |
| 2003/0030636 A1 | 2/2003 | Yamaoka | |
| 2007/0172216 A1 | 7/2007 | Lai | |
| 2007/0252900 A1 | 11/2007 | Iwaki et al. | |
| 2008/0055880 A1 | 3/2008 | Williams et al. | |
| 2008/0056569 A1 | 3/2008 | Williams et al. | |
| 2008/0056570 A1 | 3/2008 | Williams et al. | |
| 2011/0311138 A1 | 12/2011 | Williams | |

OTHER PUBLICATIONS

U.S. Appl. No. 11/850,064, Notice of Allowance mailed Dec. 9, 2010, 7 pages.
U.S. Appl. No. 11/850,064, Non-Final Office Action mailed Feb. 4, 2010, 14 pages.
U.S. Appl. No. 11/850,083, Non-Final Office Action mailed Oct. 4, 2010, 9 pages.
U.S. Appl. No. 11/850,083, Notice of Allowance mailed Jan. 21, 2011, 8 pages.
U.S. Appl. No. 11/850,227, Notice of Allowance mailed Aug. 11, 2010, 7 Pages.
U.S. Appl. No. 11/850,227, Non-Final Office Action mailed Feb. 23, 2010, 12 pages.
U.S. Appl. No. 13/090,857, Non-Final Office Action mailed Apr. 6, 2012, 10 pages.
U.S. Appl. No. 13/090,857 Final Office Action mailed Dec. 31, 2012, 8 pages.
U.S. Appl. No. 13/090,857 Notice of Allowance mailed Aug. 19, 2013, 6 pages.

\* cited by examiner

BACKGROUND SEPARATED IMAGES FOR PRINT AND ON-LINE USE

CROSS-REFERENCE TO RELATED APPLICATIONS

This application is a continuation of U.S. patent application Ser. No. 13/090,857 filed Apr. 20, 2011 (now U.S. Pat. No. 8,611,659 issued Dec. 17, 2013), which is a continuation of U.S. patent application Ser. No. 11/850,083 filed Sep. 5, 2007 (now U.S. Pat. No. 7,953,277 issued May 31, 2011), which claims the benefit of provisional application U.S. Provisional App. No. 60/824,571, filed on Sep. 5, 2006, each of which is hereby incorporated by reference in its entirety.

BACKGROUND

1. Field

This application relates to illumination fixtures and in particular to illuminating an item to facilitate providing background separated images.

2. Description of the Related Art

Images of products for advertising or other purposes are prevalent in print and on-line content. Advertisers prefer to use high quality images of products in advertisements to differentiate their products. Additionally a high quality product image can convey critical information about a product much more quickly than a text description can. Attributes of high quality images for advertising include excellent image details, clear product edges, the absence of a visible background, (thereby conveniently allowing use of the image in various contexts, such as print advertisements, web advertisement, or the like), and an absence of defects such as spots, reflections, or specular highlights. To achieve high quality product images, advertisers conventionally use photography studios that employ specialists who are experts in generating high quality images of products.

While some functions related to high quality photography may benefit from digital image processing, such as red-eye removal, achieving excellent image details with clear product edges and no visible background typically requires manual manipulation of the images, including clicking along segments of the edges of an object on a computer screen to define an outline of the object so that the object can be separated from its background. Additionally, providing high quality images for processing requires time intensive product placement, lighting, and photography with each change in product positioning often requiring adjustments to lighting. Once high quality product images are captured, specialists use manual graphic editing tools to separate the item from its background so that the item can be repurposed for various types of advertisements. As with most high quality detailed manual functions, the process is often time-consuming and costly, requiring a skilled and well trained specialist. Unfortunately, the cost of operating a photography studio of such specialists is passed on to the advertiser through high fees. To achieve improved throughput or increased capacity, additional specialists must be employed and their cost is also passed onto the advertiser. Since each image must be manipulated individually due to any change in lighting or viewing angle, creating a library of images that show multiple features or views of a product can be very expensive.

In embodiments, a photograph or digital image as described herein may be taken with lighting configured to deliver a high quality image of the object without consideration for the critical manual operation of separating the object from its background. In some cases, when taking a photograph, an outline of an object may be inadequate to ensure that the ability to separate the object from its background is of similarly high quality. Additionally, lighting in a photography studio may be optimized for lighting an object and may be inadequate to illuminate the object for the purpose of efficiently separating it from its background. As a result using a single image of an object illuminated for purposes of a high quality image can compromise a step in delivering an object image suitable for advertisers' purposes. Alternatively, the photograph or digital image may be taken in a way that compromises between obtaining a high quality image of the object and obtaining an image from which the background may be separated. In such a case, neither the quality of the image nor the quality of the separation of object from background is optimized.

Users of the Internet have come to expect on-line shopping to facilitate a superior understanding of a product before a purchase is made. High quality product images provide a high degree of information that is important to a consumer. While user interface interactive capability and dynamic displays are common aspects of today's personal computers used for on-line shopping, cost and schedule limitations of generating the necessary library of product images severely limits the extent to which on-line advertising can take advantage of these aspects. On-line consumers are often limited to a few views of the exterior of a product and do not get the opportunity to virtually interact with the product prior to purchase. As a result, consumers are either making purchases without sufficient information, or are using up a product supplier's support resources for answers to product specific questions they cannot get answered through their on-line shopping experience. However, on-line advertising, product display, and on-line shopping are especially attractive to both sellers and consumers due to the low cost of sale (and the resulting reduction in consumer price) and to consumers due to the access to information.

Therefore, there exists a need to quickly and cost-effectively generate a wide range of product images for each product to facilitate the envisioned on-line shopping experience and the resulting sales cost advantage. There also exists a need to deliver the images to on-line users in an interactive display format that facilitates easy access to the features, capabilities, and other aspects of a product necessary to make a well-informed buying decision.

SUMMARY

An aspect of the invention herein disclosed may include an image formation and processing system for delivering high quality product images with no visible background. This aspect may be achieved by using automated image processing to generate and repurpose the product images.

An advantage of this aspect of the invention may address key drawbacks of known methods and systems such as per image cost and processing time. By automating key activities while achieving higher quality product images, the methods and systems herein disclosed may dramatically lower per image cost while providing greater throughput and higher capacity of the high quality images. This may result in facilitating the development and management of a library of product images that can be used to fulfill a wide variety of product display and advertising needs.

Another aspect of the invention herein disclosed may include a user display and interface to facilitate a user manipulating a product display. An advantage of this aspect of the invention may include facilitating a user to virtually touch, turn, operate, open, tilt, activate and observe a product, and retrieve more information (e.g. detailed images, text, audio description). The interface may also allow use of game controllers or virtual reality interface devices.

The elements of the invention herein disclosed may address key aspects of a consumer purchasing process. With the invention, the consumer may view a preferred model, rather than the one on display at a local store. Details of a product, both internal and external may be easily viewed. In addition to the product, the box contents (e.g. manuals, included accessories, assembly instructions) may be available to be viewed by the consumer. Additionally, the invention facilitates providing the images and an interactive user display to deliver a rapid, automated response to a customer product query. This may result in a faster sales cycle. In embodiments, the invention may be combined with on-line sales support tools that explain product features, virtually demonstrate the product, answer frequently asked questions through images as well as text or audio, and allow a consumer to examine and evaluate a product without a time limit such as may be imposed in a physical store. Similarly, the images and interactive user interface may be beneficial to customer support organizations to guide users through debugging, assembly, accessory installation, and home servicing of products. A user may view an interactive display of installing a replacement component rather than viewing a hard copy printout of static images typically included in a product manual. The invention could be used to provide interactive images quickly in reply to a customer request for support of an aspect not already available.

In an aspect of the invention, a method for producing a background separated image, includes acquiring at least two images of an item and a background with a camera, wherein one of the at least two images provides high contrast between the item and the background; processing the contrast image to detect a separation between the item and the background, providing an edge mask; aligning the edge mask with the boundary of the item in the other of the at least two images; extracting the other image content within the aligned edge mask to produce an item-only image; and storing the item-only image in an image library.

In the method, the background is illuminated. The illumination may be uniform such as uniform in color or intensity. The illumination may be diffuse.

In the method, the background is illuminated from a side opposite the item.

In the method, the background material is textured plastic or a light diffusing film on a glass substrate.

In the method, the camera is a digital camera. The digital camera may have a resolution of at least 2000×2000 pixels, or it may be a digital video camera.

In the method, acquiring further includes configuring a plurality of camera settings for each of the at least two images wherein at least one camera setting is different for each of the at least two images.

In the method, the processing the contrast image is performed automatically by an image processor.

In the method, the processing is performed by an image processor executing a combination of standard and custom image transfer and processing software. The processing may include identifying a set of points of the background that are adjacent to a set of points of the item.

In the method, the background of the contrast image is substantially brighter than the item. The item of the contrast image is substantially black. The edge mask is an image comprising the item boundary. The edge mask may be a list of vectors in a two-dimensional coordinate space or a list of points in a two-dimensional coordinate space. Each of the at least two images reference a common origin in a two-dimensional space. The edge mask is referenced to the common origin so that the edge mask can be automatically aligned to the item in the other image of the at least two images.

In the method, aligning includes using an edge detection algorithm to identify a plurality of edges of the item in the other image of the at least two images and fitting the edge mask to the detected plurality of edges.

In the method, extracting includes deleting all content of the other image of the at least two images image other than the content within the aligned edge mask. Deleting may include changing content to white, or marking the content as deleted.

In the method, extracting includes selecting all image content within the aligned edge mask and copying the selected image content to a new image, providing a new image containing only the selected content.

In the method, the method further comprises removing image defects selected from a set consisting of product surface blemishes, dust, and specular highlights.

In the method, the item may be a product, or an accessory such as product packaging, an owner manual, a warranty certificate, a cable, a controller, or a data storage disk.

In the method, the item is one or more assembly parts such as screws, nuts, bolts, wire, wire fasteners, wrench, screw driver, and nut driver.

In the method, the item is a product for sale such as an on-line auction, an on-line purchase, a telephone purchase, an in person purchase, or a mail-order purchase.

In the method, the item is for rent.

In another aspect of the invention, a system for producing a background separated image, includes a camera for acquiring at least two images of an item and a background, wherein one of the at least two images provides high contrast between the item and the background, providing a contrast image; an image processor for processing the contrast image to detect a separation between the item and the background, providing an item edge mask, wherein the edge mask is aligned with the boundary of the item in the other of the at least two images, and the other image content within the aligned edge mask is extracted, providing an item-only image; and an image library for storing the item-only image.

In the system, the background is illuminated. The illumination may be uniform, such as uniform in color or intensity. The illumination may be diffuse.

In the system the background is illuminated from a side opposite the item. The background material may be textured plastic or light diffusing film on a glass substrate.

In the system, the camera is a digital camera. The digital camera may have a resolution of at least 2000×2000 pixels or may be a digital video camera. The camera includes a plurality of camera settings wherein at least one of the plurality of camera setting is different for each of the at least two images.

In the system, the image processor is an image processor executing a combination of standard and custom image transfer and processing software In the system, the background of the contrast image is substantially brighter than the item. The item of the contrast image is substantially black.

In the system, the edge mask may be an image comprising the item boundary, a list of vectors in a two-dimensional coordinate space, or a list of points in a two-dimensional coordinate space.

In the system, the at least two images include a common origin in a two-dimensional space. The edge mask includes the common origin so that the image processor can automatically align the edge mask to the item in the other image of the at least two images.

In the system, an edge detection algorithm to identify a plurality of edges of the item in the other image of the at least two images and a boundary matching algorithm for fitting the edge mask to the detected plurality of edges.

In the system, algorithm are further included for one or more of deleting all content in the other of the at least two images that is not within the aligned edge mask, changing to white all content in the other of the at least two images that is not within the aligned edge mask, and marking as deleted all content in the other of the at least two images that is not within the aligned edge mask.

In the system, the item-only image includes only the image content within the aligned edge masked In the system, an algorithm is included for correcting image defects such as product surface blemishes, dust, and specular highlights.

In the system, the item may be a product, or an accessory such as product packaging, an owner manual, a warranty certificate, a cable, a controller, or a data storage disk.

In the system, the item is one or more assembly parts, such as screws, nuts, bolts, wire, wire fasteners, wrench, screw driver, and nut driver.

In the system, the item is a product for sale such as an on-line auction, an on-line purchase, a telephone purchase, an in person purchase, a mail-order purchase.

In the system, the item is for rent.

In another aspect of the invention, a method of accumulating a set of item-only images of an item comprises providing a camera for acquiring images of an item; providing an illumination fixture for illuminating the item; acquiring a plurality of images of the item from different perspectives, wherein the item is illuminated by the fixture; automatically processing each of the plurality of images to generate item-only images; and associating the set of item-only images in an image library for presentation to a user.

In another aspect of the invention, a method of presenting item-only images comprises providing a set of item-only images of an item; selecting at least one item-only image; combining the at least one selected item-only image with a background, providing an repurposed image; and receiving an item request from a user, and in response thereto presenting the repurposed image to the user.

In the method, selecting at least one item-only image is based at least in part on the item request.

In the method, the method further comprises receiving a request from a user to adjust a perspective view of the item and in response thereto: selecting a second item-only image from the set of item-only images; combining the second item-only image with a background, providing a perspective item image; and presenting the perspective item image to the user.

In the method, the item display image is presented to the user in one or more of an on-line product purchase activity or an on-line product support activity.

In the method, the item-only image includes a representation of an interior of a product.

In the method, the background includes one or more of icons that represent aspects of the item. Selecting one of the one or more icons presents the aspect of the item. The aspects selectable through the one or more icons include an internal view of the item, a manual, one or more accessories, assembly instructions, product packaging, service plans, peripherals, and alternate configurations of the item.

In another aspect of the invention, a method of customer support comprises: receiving a support request from a user; acquiring one or more item-only images of an item identified in the support request; repurposing the one or more item-only images for presentation to the user; and providing the repurposed images to the user as a response to the support request.

In the method, the support request is selected from a list consisting of trouble shooting, assembly, accessory installation, home service, upgrading, and returning the item.

In the method, providing the repurposed images includes one or more of displaying the repurposed images on a computer, rendering a video comprising the repurposed images, printing the repurposed images, sending the repurposed images as an email attachment, posting the repurposed images to a web site, storing the repurposed images on a server.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Figure 1:
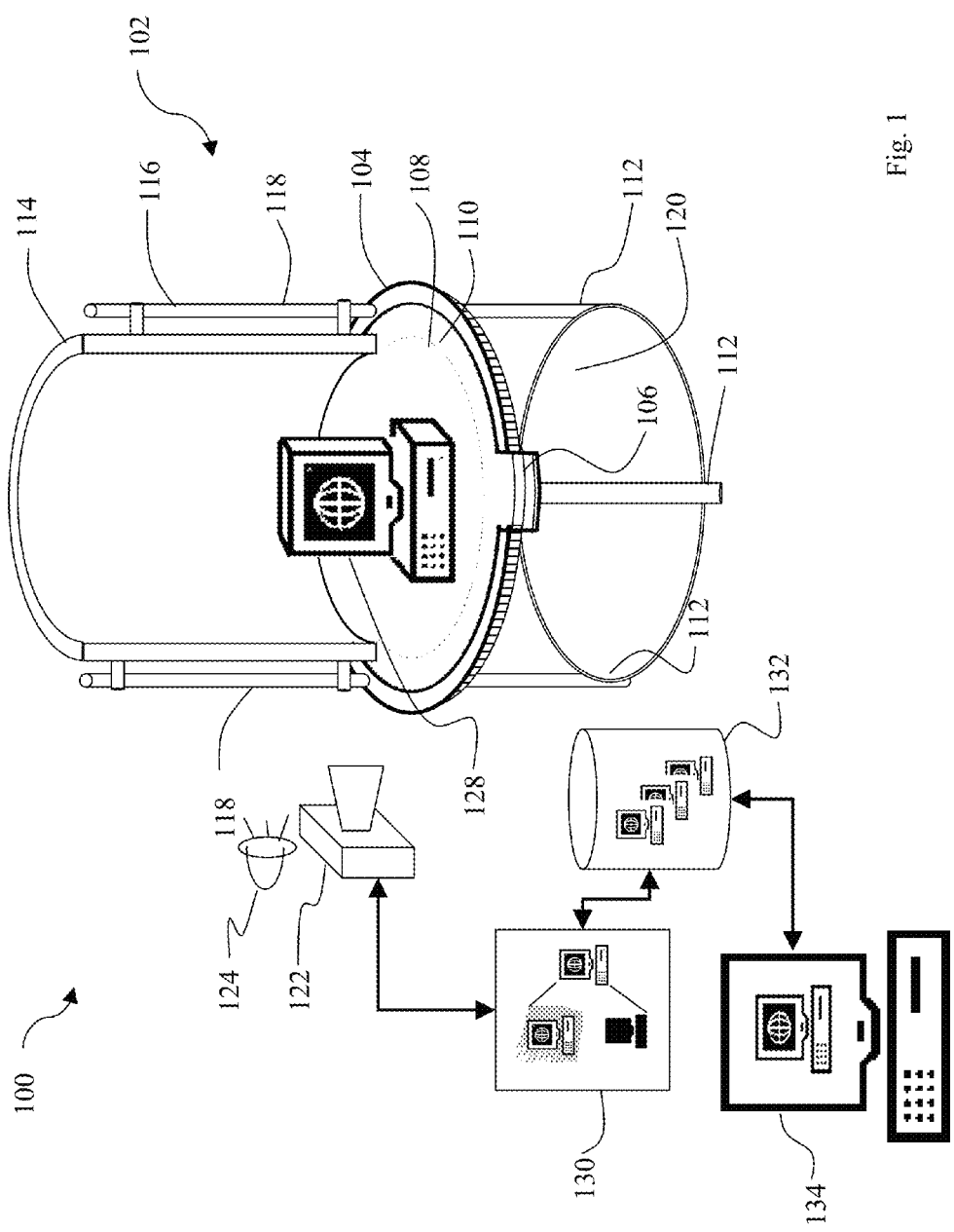
FIG. 1 depicts an image formation and processing system for rendering high quality item images without any background.

An aspect of the present invention involves an image formation and processing system 100 for producing high quality images of items so that the images contain no visible background or are readily separated from the background. An aspect of the image formation and processing system 100 includes rendering high quality images of items that are free of all background. To render such high quality item-only images, the image formation and processing system 100 may be adapted to eliminate any impact on the uniformity of background illumination such as shadows or reflections cast by the item being photographed.

Film photography exposes a photographic film to all elements within a camera's field of view, thereby recording the item and any visible background on the film. Even small variations in a nearly uniform background may be detected and recorded by film photography. Therefore post processing to separate the item from the background is necessary. To achieve a background-less image in film photography would require that only the object be printed on the photograph paper. Because of the film exposure process described above, there is no direct equivalent of a background-less image in film photography.

While also capturing all elements within a camera's field of view, digital photography creates a digital image that can be processed through an image processor in which image processing techniques may be applied to remove the background. One image processing technique may include automatically identifying the outline of the item so that the image processor can remove image data outside of the item outline (such data being the background). The accuracy of outline identification can significantly affect the quality and usefulness of the resulting product image.

The image formation and processing system 100 may combine digital image formation using the image formation facility 102, camera 122 and lights 124, with image processing using the image processor 130 to identify the outline of an item 128 to a high degree of accuracy. Identification of an outline of an item 128 may be an automatic process. The image formation and processing system 100 may further apply image processing techniques to automatically extract the item 128 data from acquired images using the identified outline.

Objects often include complex three-dimensional outlines that may not transfer well when being captured by a two-dimensional digital camera image sensor. This is particularly apparent when a three-dimensional object is photographed in perspective view. Also, variations or inadequate lighting may further complicate the distinction of a trailing surface of the object and its background. By generating consistently uniform background illumination, the invention provides images that allow these complex three-dimensional outlines to be represented as simple sharp contrast changes in a two-dimensional image. Throughout this disclosure the phrase "such as" means "such as and without limitation". Throughout this disclosure the use of "example", such as in "for example" and "in an example" means an example and without limitation.

Referring to FIG. 1, the image formation and processing system 100 may comprise an image formation facility 102 for uniformly illuminating an item 128, a camera 122 for capturing and transferring the image, lighting 124 for illuminating visible surfaces of the item 128, an image processor 130 for processing images, an image library 132 containing images, and a user display 134 configured for interactively displaying the item images.

The image formation facility 102 may be comprised of a structural support ring 104 into which a transparent platform 108 is slidably inserted. The support ring 104 circumferentially captures the platform 108 and may form a substantially horizontal surface for supporting and rotating the item 128 to facilitate acquiring images of the item 128 from a plurality of directions. A light reflection diffusion ring 110 may border the structural support ring 104 on the platform 108 to eliminate unwanted reflection of light from the support ring 104. The light reflection diffusion ring 110 may prevent non-uniform illumination by diffusing light reflecting from the support ring 104. Working height support for the structural ring 104 may be provided by a plurality of legs 112. The legs 112 may further support a curved diffusion backdrop 114 through an association with a backdrop frame 118. The diffusion backdrop 114 may be illuminated to facilitate a uniformly illuminated background for the item 128. The legs 112 may also support a diffusion panel 120 below and substantially parallel to the platform 108 for providing uniform light to the platform 108.

When an item 128 is placed approximately centered on the platform 108, a plurality of images of the item 128 may be acquired with the camera 122 and transferred to processor 130 for processing and storage in the image library 132. The camera 122 and lights 124 may be integrated with the image formation facility 102, or they may be separately supported by a stand (not shown), or held by a photographer.

As shown in FIG. 1, a platform 108 may be a clear glass plate. Such a plate may provide a stable, strong surface on which an item 128 may be placed for photographing. Additionally, a glass plate may provide excellent light transmission properties to facilitate a uniformly illuminated surface for photographing an item 128.

In embodiments, the platform 108 may be constructed of light diffusing plastic. In other embodiments, the platform 108 may be a glass plate with light diffusing film applied to one or both sides. In an example of such an embodiment, a non-diffuse light may illuminate the platform 108 from below and the platform 108 may diffuse the light. The diffuse light from platform 108 may uniformly illuminate the item 128 from below and the platform 108 may appear as a substantially uniform white background when imaged by a digital camera. Anti-reflective glass may be used for the platform 108 to reduce reflections. In embodiments, the glass of the platform 108 may be low iron-glass to reduce reflections.

Polarized light may facilitate acquiring images that enable separation of the item 128 from a background. Polarized light may be provided by a polarized light source or may be provided by polarizing filters disposed between the light source and the item 128 and camera 122. To provide polarized light, the backdrop 114 and the glass plate 108 may be wrapped with a polarizing filter so that light passing through the backdrop 114 and plate 108 may be polarized. A second polarized filter may be included in the optical system of the camera. When the filter in the camera optical system is tuned to reject light that is polarized by the backdrop 114 and/or plate 108, light that passes directly from the backdrop 114 and the plate 108 to the camera 122 will not pass through the camera optical system filter. In this way, the light that makes up the background for the item 128 will not be acquired by the camera 122.

Polarized light that impacts the item 128 being photographed may scatter as reflected light thereby changing the polarization of the reflected light. Because the filter in the camera optical system is tuned to reject only light that matches the polarization of the background light, the light reflected off the item 128 may be acquired by the camera 122 because it may pass through the camera optical system filter. The resulting image acquired by the camera 122 may include only the light that is scattered by reflecting off of the item 128. Thus, a camera filter tuned to filter out light that is polarized by the polarized backdrop 114 and polarized plate 108 may facilitate good separation between the image of the object (composed of scattered light) and the background (composed of polarized light).

The support ring 104 may be formed of steel, aluminum, or other material that is sufficiently strong to stably support the platform 108, backdrop 114, backdrop frame 118, and item 128. In embodiments, the platform 108 is a round disk shaped platform and support ring 104 is a ring with an outer diameter slightly larger than the platform 108. In this example, a support ring 104 may have a U-shaped profile with the U channel extending inward to capture a portion of the circumference of the platform 108, thereby supporting the platform 108. The support ring 104 may be fastened to the legs 112 so that the support ring 104 and the legs 112 do not move when the platform 108 is rotated within the U-shaped channel.

To facilitate smooth rotation of the platform 108 within the support ring 104, an intervening material, such as plastic or self-lubricating nylon may be disposed between the platform 108 and the support ring 104. In embodiments, the support ring 104 provides a user access region 106 to a portion of the platform 108 circumference to facilitate rotating the platform 108. In another embodiment, the support ring 104 may be "L" shaped so that lower horizontal extension of the "L" supports the platform 108 from below. In such an embodiment, the intervening material may also be used to facilitate smoothly rotating the platform 108.

The legs 112 may be constructed of aluminum, steel, or other material that is capable of supporting the image formation facility 102. In the embodiment depicted in FIG. 1, three legs are assembled to support ring 104. At least one of the legs 112 may include a leveling mechanism to facilitate leveling the platform 108. In the embodiment depicted in FIG. 1, each leg may include a leveling mechanism to allow adjustment of the platform 108 to a horizontal position on a variety of uneven surfaces.

The diffusion panel 120 may be constructed of a light diffusing material such as textured plastic and may be assembled to the legs 112. The diffusion panel 120 may be constructed of glass with a diffusion film applied to one or more surfaces. To achieve a high degree of uniformity of light, the diffusion panel 120 may be constructed to deliver a high degree of haze. Haze is a measurement of wide-angle scattering that causes a lack of contrast across the diffusion panel 120. The diffusion panel 120 may include a light source, such as one or more fluorescent lights below the diffusion panel 120 that enables the diffusion ring to transmit diffused light to the platform 108. The diffusion panel 120 and accompanying light source may be mounted to the legs 120 at an intermediate position between the platform 108 and the leveling mechanism at the bottom of the legs 112. The diffusion panel 120 may be disposed within the image formation facility 102 so that only the diffusion panel 120, the item 128, and the backdrop 114 are imaged by the camera 122. This may be accomplished by extending the diffusion panel 120 beyond the diameter of the support ring 104. This extension generally may be beneath the platform 108 and support ring 104 in the direction of the backdrop 114.

The diffusion backdrop 114 may be supported by a backdrop frame 118 so that the lower edge of the diffusion backdrop 114 is in close proximity to a top surface of the platform 108. In embodiments, the backdrop frame 118 may mount on top of support ring 104. In other embodiments, the backdrop frame 118 construction may include upward vertical extensions of at least two of the legs 112. In such an embodiment, each of the leg 112 may attach to the support ring 104 through a bracket that secures the support ring 104 to a vertical portion of the leg 112.

The backdrop frame 118 may include horizontal extensions 116 to which the diffusion backdrop 114 is attached. In embodiments, the horizontal extensions 116 may be slidably attached to the backdrop frame 118 so that they may be adjusted horizontally and vertically, and secured in the adjusted position. Such an embodiment may allow precise positioning of the diffusion backdrop 114 relative to the platform 108 to facilitate a uniformly illuminated background for the item 128.

In embodiments, the bottom of the frame 118 may be constructed like a drum. An inside ring may be wrapped, such as with a white screen, then pulled tight to form a drum-like structure, then secured by an outside ring.

In embodiments, the platform 108 is supported by legs, which may need to be reinforced to support heavy objects. In embodiments, a motor assembly may be used to rotate the platform 108. In embodiments, bearings, such as air bearings, are used to support the platform 108.

The diffusion backdrop 114 may be curved, similarly to the support ring 104. However the curve of the diffusion backdrop 114 may be of a smaller radius than the support ring 104 so that the surface of the backdrop 114 facing the item 128 is within the radius of the support ring 104. The diffusion backdrop 114 may be constructed of a light diffusing material such as textured plastic. The diffusion backdrop 114 may be constructed of glass with a diffusion film applied to one or both surfaces. To achieve a high degree of uniformity of light, the diffusion backdrop 114 may be constructed to deliver a high degree of haze. Haze is a measurement of wide-angle scattering that causes a lack of contrast across the diffusion backdrop 114. In embodiments, the diffusion backdrop 114 may be illuminated. A light source for illuminating the diffusion backdrop 114 may be attached to the backdrop frame 118 or the diffusion backdrop 114. A light source for the diffusion backdrop 114 may be one or more fluorescent lights arranged so that when the light source is turned on, the diffusion backdrop 114 generates uniform light intensity and color.

In embodiments, the light source for diffusion backdrop 114 and the diffusion panel 120 may be controlled individually so that each may provide the same, similar, or different light intensities and colors. Light for the diffusion backdrop 114 and for the diffusion panel 120 may be provided by a variety of light technologies including fluorescent, incandescent, LED, electroluminescent, halogen, and such lighting that may provide a range of intensity, and may provide a substantially white light.

When the diffusion panel 120 and the diffusion backdrop 114 are properly illuminated, an item 128 on the platform 108 may appear in a photograph as having no visible means of support. This may be accomplished by the diffusion panel 120 and the diffusion backdrop 114 providing a uniform, substantially white backdrop for the item 128.

Referring further to FIG. 1, the image formation facility 102 may be constructed to support and facilitate photographing a wide variety of items 128 ranging from small items such as a coin, to large items such as a high definition Television. The embodiment depicted in FIG. 1 may be suitable for photographing office and personal electronics products e.g. computers such as desktops, notebooks, tablet PCs, personal digital assistants (PDA), servers, workstations, fax servers, internet-cache servers, barebones systems, POS/kiosk systems; monitors & displays such as CRT monitors, LCD monitors, plasma monitors, projectors; printers such as color laser, mono laser, ink-jet, photo printers, multifunction units, dot-matrix, plotters, label printers, bar code printers, specialty printers, receipt printers, scanners, point-of-sale printer; software such as antivirus software, business software, development tools, education & entertainment, graphics & publishing, internet software, network mgt. software, OS & utilities, security; electronics such as digital cameras, film cameras, camcorders, security cameras, games, digital media players, televisions, home audio, home video, home furniture, GPS, telephony, appliances, office equipment; networking such as adapters, client, communications, conferencing, hubs, infrastructure, KVM switches, modems, routers, security, software, switches, test equipment, wireless; storage devices such as CD drives, CD-DVD duplicators, CD-DVD servers, DVD drives, fibre channel switches, flash drives, floppy drives, hard drives, magneto-optical drives, media, network attached storage, removable drives, SAN equipment, storage enclosures, tape automation, tape drives; accessories such as cables, memory, flash memory, power & surge protection, computer components, audio hardware, video hardware, keyboards & mice, batteries, carrying cases, computer accessories, printer supplies, CD-DVD accessories, monitor & display accessories, mounting hardware, camera-camcorder accessories, PDA accessories, network accessories, projector accessories, scanner accessories, computer furniture, phone, cellular accessories, office & cleaning supplies, and the like.

The image formation facility 102 may also be suitable for facilitating photography of a wide variety of other products such as office products including AV supplies & equipment, basic supplies & labels, binders & accessories, janitorial, business cases, calendars & planners, custom printing, desk accessories, executive gifts, filing & storage, paper, forms, envelopes, pens, pencils & markers, printer & fax supplies, promotional products, school supplies; phones & accessories, or other products found in office, school, or home environments, and the like.

The image formation facility 102 may also be suitable for facilitating photography of other items such as groceries, produce, cuts of meat, deli products, health and beauty products, clothing, towels, pillows, artwork, models, tableware, collectibles, antiques, potted plants, financial instruments such as bonds, certificates of deposit, currency, and the like. In addition, the image formation facility 102 may be suitable for facilitating photography of humans, such as models. Background-less images of models may be useful in advertising by allowing an advertiser to "place" a model in an advertisement that includes any background. In an example, an advertiser may use the image formation facility 102 to photograph a model and then place the model into an advertisement of a sunset taken at a different location.

In general, any item 128 that may remain stable when placed on the platform 108 within the working volume of the image formation facility 102, may take advantage of aspects of the invention that facilitate high resolution photography. In an embodiment of the image formation facility 102, the working width may be approximately 72 inches, and the working height of the backdrop 114 above the platform 108 may be approximately 36 inches.

Items 128 may be photographed within their packaging, partially removed, or fully removed from their packaging to record item 128 unpacking or repacking for display as an assembly video. Additionally, the package contents such as documentation, software, warranty cards, cables, batteries, remote controllers, car chargers, wall chargers, assembly tools, assembly fasteners, loose-supplied parts, anti-static packaging and the like may be photographed.

An item 128 requiring assembly by a user may be photographed at various stages of assembly, or may be continuously photographed during assembly to generate an assembly procedure video. Additionally, battery installation, or product installation (such as connecting a power cord, or attaching speakers) may be photographed. By using proper audio recording equipment, such as may be provided by a digital camcorder embodiment of the camera 122, audio may also be recorded and/or combined with the assembly procedure video to provide an audio description of assembly steps, techniques, benefits, and the like.

An item 128 may be photographed in various states of initialization and operation. Photographing a user turning on the item 128, inserting a CD-ROM, changing a channel, selecting an item setting (e.g. for audio equipment, audio settings like base, treble, balance, and the like), opening a compartment, closing a compartment, turning off the item 128, and other operation related settings may facilitate a user's understanding of interacting with the product. Such features may include any features that the user can change, control, or modify.

An item 128 may be photographed from a plurality of angles and positions. In an example, an item 128 front, back, side, top, or bottom may be photographed. Additionally, an item 128 may be photographed with the focal plane other than parallel to a surface of the item 128, such as when the item 128 is photographed with the camera 122 directed at a 45 degree angle relative to vertical. A perspective view photograph may include more than one surface of the item 128, such as the front and top of the item or a side and back as if the item were viewed looking toward a rear corner. Perspective views may provide visual confirmation of the shape of the item 128.

Referring to FIG. 1, the camera 122 of the image formation and processing system 100 may be a digital still camera. In an example, the camera 122 may have a resolution of at least 2000×2000 pixels. In other embodiments, the camera 122 may have a resolution lower than about 2000×2000 pixels. It may be understood by one skilled in the art that a camera 122 with any resolution may be used with the image formation and processing system 100.

The camera 122 may also provide controls for a variety of settings that impact the acquired image. In embodiments, a camera may provide user settings such as resolution, zoom (optical and/or digital), aperture speed, f-stop setting, focus, auto exposure, white balance, macro mode, flash operation, and the like. The camera 122 may also include capabilities which affect performance and quality such as lag time, burst mode for rapid succession (such as video), CCD or CMOS sensor, image storage media (e.g. removable), 24 bit or greater color depth, low loss or lossless image compression, image output format support for standards such as JPEG, RAW, and TIFF, and the like. Additional camera features such as interface type (RS232, RS422, parallel port, SCSI, USB, IEE1394, wireless, and infrared), batteries (Alkaline, NiCad, NiMH, LiOn), on screen display, date/time in image, sound recording, software (download, editing), and the like may also be factored into the selection of a camera 122.

Exemplary digital cameras such as Agfa ePhoto, Canon PowerShot, Canon EOS, Casio QV, Concord Eye-Q, Fujifilm FinePix, HP PhotoSmart, Jenoptik Jendigital, Kodak DC, Konica Minolta DiMAGE, Kyocera Samurai, Nikon Coolpix, Olympus E, Pentax EI, Pentax Optio, Polaroid PDC, Premier DC, Pretec DC, Samsung Digimax, Sanyo DSC, Vivatar ViviCam, Yashica Finecam, or a digital video camera such as Canon Elura, Canon Optura, Canon ZR, Hitachi DZ, JVC Everio GZ, JVC GR, Panasonic Proline, Panasonic PV, Panasonic VDR, Samsung SC, SharpViewcam, Sony DCR, Sony Handycam, Sony HDR, Toshiba GSC, and the like may meet one or more requirements for use with the image formation and processing system 100.

In an aspect of the invention, lighting 124 may be used to illuminate the item 128 being photographed. Lighting 124 may be coordinated with photographic settings of the camera 122 to facilitate capture of high quality images of the item 128. In an example, increasing the amount of light incident on the item 128 may cause the item 128 to washout in the image unless the camera 122 shutter speed is increased. Faster shutter speeds may reduce the amount of light that reaches the camera 122 image sensor, thereby reducing the potential to washout the item 128. Faster shutter speeds may also reduce the amount of light reaching the camera 122 from the background. This may facilitate eliminating the background by causing the background to appear black, further enhancing the distinction of the item 128 from its background.

In embodiments, the lighting 124 source may be one or more strobe lights. The actuation phase and duration may be coordinated with the camera 122 shutter speed and timing in order to facilitate high quality image capture. In other embodiments, the lighting 124 may be a continuous illumination source, such as fluorescent, incandescent, LED, or other continuous illumination lighting technology. For purposes of illuminating an item 128 to be photographed, the lighting 124 may use a plurality of lights at one or more positions facing the item 128 from one or more angles such as from the front, top, and sides. The lighting 124 may be used to create lighting effects such as shadow, highlights, depth, contrast and other visual effects. Lighting may be white, although other color lights may be used to create color effects. Any combination of light types, colors, quantities, and positions may be used to illuminate the item 128.

In embodiments, the lighting 124 may be used in combination with illumination from the backdrop 114 and the platform 108 to create a high contrast image that includes sharp edge definition of the item 128. The camera 122 may be configured with settings that facilitate acquiring such a high contrast image.

In embodiments, there may be a benefit to changing the camera settings between the camera exposure used to photograph the object and the exposure used to distinguish the object from the background. Camera settings such as relating to shutter speed and aperture may be adjusted, such as to provide a very high quality image of the object in one case, while providing image contrast between the background and the object in the other case. Shutter speed and aperture may be adjusted, among other things, to account for different lighting conditions, with the object being front lit to obtain a high quality image that will be used for reproduction, and the object being back lit (typically with less light) to obtain a sharp distinction between the image and its background. In an example, the main image may be shot with a shutter speed of 1/200th of a second at f22, while the backlit image may be shot with a shutter speed of 1/4th of a second at f14. Other combinations may be suitable, depending on the respective lighting conditions for the two shots. In embodiments the shutter speed and aperture are automatically adjusted between shots, such as under control of a computer facility.

In embodiments, the lighting for the backlit image or the primary image may be provided by LEDs, such as an array of LEDs for the back light that provide even illumination of the background.

Aperture settings may also be adjusted to address depth of field issues. With a small aperture, the lens used to take an image may have a wider depth of field.

In embodiments, it may be desirable to use the aperture and exposure settings of the camera to eliminate a low light originating behind or visible around the item 128. This may be accomplished by reducing the camera aperture and exposure time to effectively shut out the lower light level so that only the front illumination of the item is captured by the camera. By selecting an effective combination of aperture and shutter speed, it may be possible to get a high quality front-lit image with good contrast.

Referring to FIG. 1, the image processor 130 for processing images of the image formation and processing system 100 may comprise a general purpose computer executing a combination of customized and commercially available software. In embodiments, the image processor 130 may be a personal computer executing customized scripts automating Adobe Photoshop image processing software.

The image processor 130 may be a single computer or a network of computers in a client-server configuration. In embodiments, the image processor may connect through a network to other network devices such as the camera 122, the image library 132, the user display 134, other computers, printers, scanners, data storage devices, network bridges, routers, and other computer network devices.

The images acquired by the camera 122 may be transferred to the image processor 130 over a network such as an intranet, Ethernet, or other data communication network suitable for image transfer. In an example, the camera 122 may transfer images to the image processor 130 through a USB port. In another example, the camera 122 may transfer images to the image processor 130 through an IEE1394 port. The image may be transferred through a wired connection or a wireless connection between the camera 122 and the image processor 130. In embodiments, the image processor 130 may be integrated into the same enclosure as the camera 122.

Images may be transferred from the camera 122 to the image processor 130 during image acquisition by the camera. Images may be transferred individually or in groups such as in batch mode between the camera 122 and the image processor 130. The camera 122 may have storage capacity for a plurality of images that may facilitate batch mode image transfer. Images may be transferred automatically upon acquisition by the camera 122, by a user directed action, on a predetermined schedule, or as a result of another action such as a new image being acquired by the camera 122. Image transfer may adhere to one or more protocols such as PictBridge, WIA, Picture Transfer Protocol, PTP/IP, Media Transfer Protocol, and other protocols which facilitate transfer of images from one device to another.

The image processor 130 may be executing custom software that may be coded in a variety of programming languages such as C, C++, Objective C, AppleScript, JAVA, JavaScript, HTML, visual basic, or a script language compatible with a commercial image processing software product such as Adobe Photoshop. The customized software may be embodied in a program, a macro, a script, or other suitable software embodiment.

In an embodiment, the methods and systems disclosed herein may be accomplished using a computer system that uses an operating system that supports a graphical user interface, such as the Apple Mac OS X operating system, which includes integrated applications such as Finder for interfacing with the storage of files and folders, and Xcode which allows the building of Mac compatible scripts and fully operational applications that may act on their own or interact with existing software. In embodiments, Xcode supports developers using C, C++, Objective C, AppleScript, and Java. The Image processor 130 may be primarily written in AppleScript and JavaScript. These applications may interface and run commands between Finder and Adobe Photoshop, where the actual image processing may occur.

The image processor 130 may be executing commercially available software such as Adobe Photoshop, for example. However other commercially available image processing software such as Captiva, Tinderbox, Shake, and similar image processing software capable of automation of at least some functionality may be used. In embodiments, the image processor 130 may execute a combination of commercial software products and custom software programs to perform the necessary functions of interfacing with the camera 122, automatically processing the transferred images to generate an item-only image, and storing the image in the image library 132.

The image formation and processing system 100 may include an image library 132 containing images processed by the image processor 130. The image library 132 may be adapted to facilitate the automated storage and retrieval of item images based on some aspect of the item 128. In an example, the image library 132 may organize images according to the item 128 model number, part number, serial number, vendor code, option, stock keeping unit (SKU), or other information that easily associates an image in the image library 132 to an item 128. The image library 132 may include all images acquired by the camera 122 as well as the images processed by the image processor 130. The image library 132 may be configured based on a file system such as NTFS, FAT, HFS+, UNIX, Joilet, and the like. Alternatively, the image library 132 may be configured as a database, such as a Sequel or Access database.

In embodiments, images in the image library 132 may be used for display or printing and may be repurposed for a specific use by the image processor 130. In an example, one or more images in the image library 132 may be presented on the user display 134 for purposes of facilitating a user viewing and learning about the item 128 depicted in the images. In another example, one or more of the images in the image library 132 may be provided to a printer for purposes of printing a catalog or other advertisement displaying the item 128 depicted in the images.

An alternate embodiment of the image formation facility 102 may comprise a motorized means for rotating and tilting the item 128 to automate image acquisition with a plurality of cameras. In embodiments, a motor may be disposed in various locations to enable movement of the platform 108. The example, a motor, a pair of motors, or more motors may be located underneath the platform 108, on top of the platform 108, or to the side of the platform 108. In embodiments, a belt may be supplied around the platform 108 to reduce friction during movement. In embodiments, air bearings or other bearings may be used to support movement. In embodiments, the motor may have motor control software, which may be integrated with, and under the same control as, the software that may be used to acquire the images of the object held on the platform 108, such as to cause the motor to rotate the object into a desired position, and then capture the images of the object. In embodiments, automation software may automate image taking and platform movement, such as to take a predetermined sequence of shots of an object.

In embodiments, a mask may be provided inside the camera viewfinder, to show the area that will be cropped around the object during processing of the image. In such cases, what the viewer sees through the viewfinder may be matched to what will be handled by the image processing software.

Figure 2:
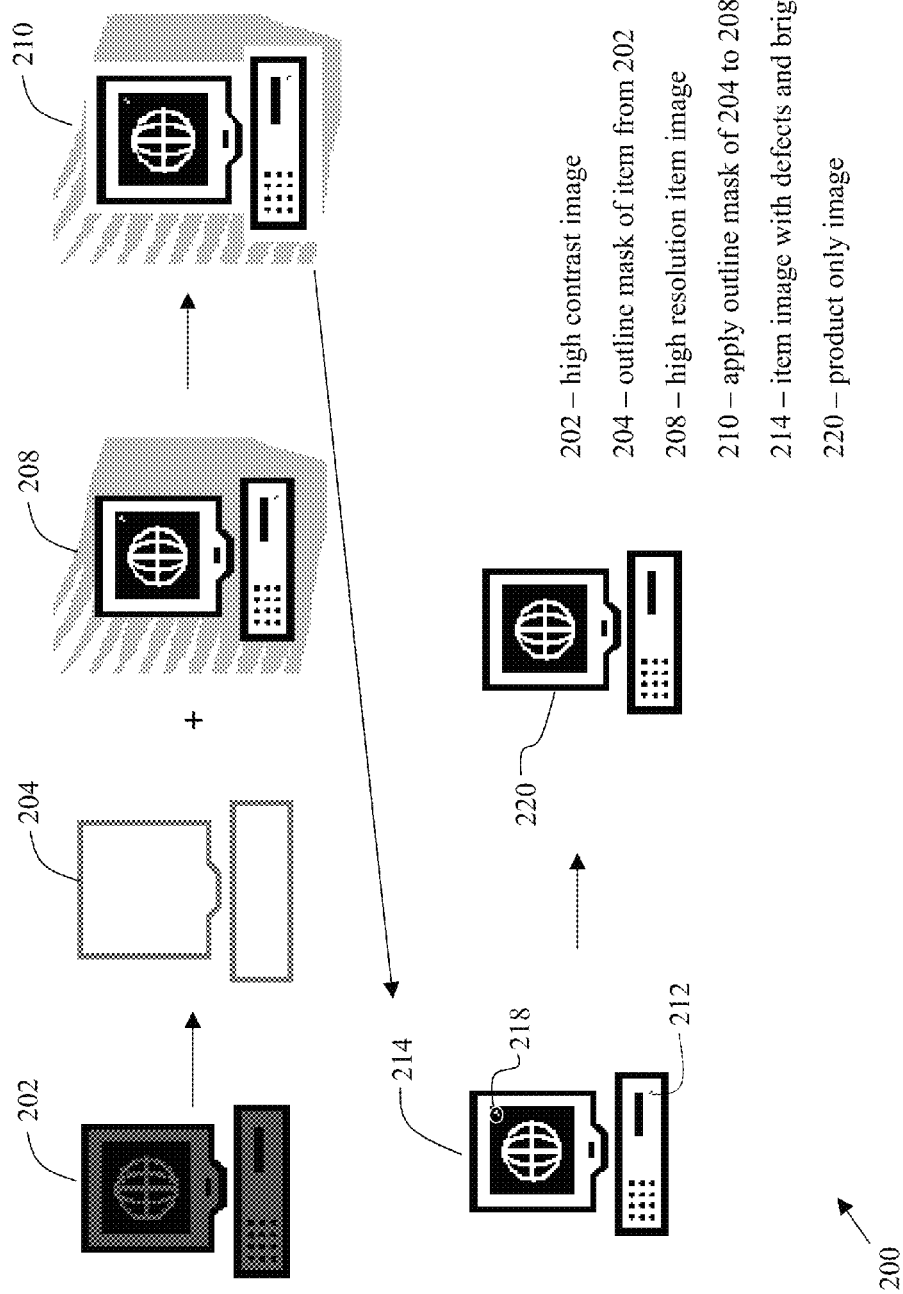
FIG. 2 depicts a method of processing images captured with the image formation system of FIG. 1.

FIG. 2 depicts a process 200 of rendering an item-only image 220 of an item 128 photographed using the image formation and processing system 100. The process 200 gains substantial advantage over manual methods by using aspects of the image formation and processing system 100 that ensure images of items 128 are automatically and quickly produced with consistently high quality at low cost.

In embodiments, the process 200 may rely on a difference between illumination levels within an image to facilitate automatic processing by an image processor 130. The process 200 may involve acquiring at least two different images from a single perspective. One of the two different images may be acquired with camera settings that facilitate using the image formation facility 102 to present the item 128 substantially in silhouette, thereby acquiring a silhouette image 202. The silhouette image 202 may have very high contrast between a bright background and the dark item 128. The very high contrast of the silhouette image 202 may facilitate the image processor 130 automatically and accurately detecting the edge of the item 128 to generate an edge mask 204. The edge mask 204 may include a set of image points along the visible perimeter of the item 128, wherein the points accurately define a separation between the item 128 and the background.

The other of the at least two different images, a high quality image 208 of an item 128 presented by the image formation facility 102 may be acquired by the camera 122 with the assistance of the lights 124 illuminating the item 128. While the backdrop 114 and the lower diffusion panel 120 may be illuminated moderately to facilitate acquiring the high quality image 208, camera settings such as f-stop may be different from those used to acquire silhouette image 202.

The edge mask 204 may be superimposed on the high contrast image 208 so that the edge mask 204 aligns with the item 128. Aligning the edge mask 204 with the item 128 facilitates automatically separating the item 128 from the background as shown in composite image 210. The image processor 130 may automatically extract image content within the aligned edge mask 204 from the high resolution image 208 and automatically generate a new image such as that shown in extracted image 214. The extracted image 214 includes only item 128 image content from the high quality image 208.

Edge mask 204 may be an image containing image data which is known to the image processor 130 as representing the outline of the item 128. In an example, silhouette image 202, edge mask 204 image, and high resolution image 208 may all be referenced to a common origin point in a two-dimensional image space. The image processor 130 may combine the images in the image space to facilitate processing.

Edge mask 204 may be a set of vectors. In embodiments, image processor 130 may apply edge mask 204 vectors to the high resolution image 208 in the two-dimensional image space to separate the item 128 from the background of the high resolution image 208.

In other embodiments, image processor 130 may apply other image alignment algorithms that do not require the high resolution image 208 and the edge mask 204 to reference a common origin. Image alignment algorithms may include techniques such as pattern matching, edge detection, or a combination of these and other techniques that generate an accurate alignment of the edge mask 204 to the item 128 of the high resolution image 208.

While the extracted image 214 may be stored in the image library 132, it may be further processed by the image processor 130 to remove image defects, such as dust 212, and image formation defects, such as specular highlights 218 to generate an item-only image 220. The item-only image 220 may be suitable for printing, inclusion in a print catalog, or for display on an electronic display such as a computer monitor.

Image processing software, such as Adobe Photoshop, and many other commercially available titles, may include image enhancement capabilities and/or features that facilitate removal of image defects such as dust 212 and specular highlights 218. In embodiments, the image processor 130 may include automated scripts or programs that facilitate automating image enhancement through commercially available image processing software.

Each image-processing step may be manually executed within Adobe Photoshop through user input. The image processing application 130 automates the execution of the repetitive tasks in the form of script actions to step Photoshop through analyzing each image set. The user may set or adjust the threshold and tolerance levels Photoshop uses to distinguish between foreground and background information when generating the outline mask 204 from the high contrast image 202 prior to batching sequence.

The image processing application 130 may be programmed to automate several resizing and cropping procedures that fit the user's needs for each Web and print-related image set that is being processed. These tasks may all be performed using image processing software, such as Photoshop.

A collection of item-only images 220 from a variety of perspectives of the item 128 may be combined in an interactive user display 134 with a user interface adapted for facilitating a user viewing the item 128 from the variety of perspectives. The perspectives may include the front, sides, back, top as well as interior views, and various views of the item 128 in operation, assembly, and packaging. One such perspective may include a user rotating the item 128. Another may include a user opening a door or compartment of the item 128, or turning on/off the item 128.

Figure 3:
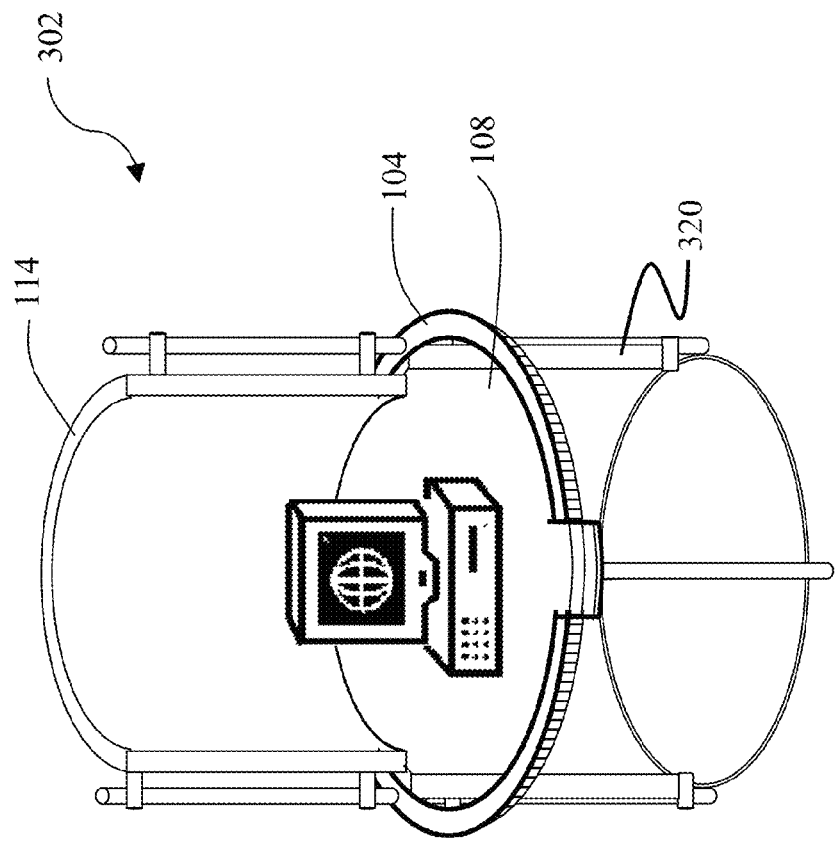
FIG. 3 depicts an alternate embodiment of the image formation facility.

FIG. 3 depicts an alternate embodiment of the image formation facility 302 wherein the lower diffusion panel 120 shown in the embodiment of FIG. 1 is replaced by a lower diffusion backdrop 320. The lower diffusion backdrop 320 may provide diffuse uniform illumination in a similar way to the diffusion backdrop 114. When the lower diffusion backdrop 320 and the diffusion backdrop 114 are properly illuminated, an item 128 on platform 108 may appear in a photograph as having no visible means of support. This may be accomplished by the lower diffusion backdrop 320 and the diffusion backdrop 114 providing a uniform, substantially white backdrop for the item 128.

In embodiments where image formation and processing system 100 includes two backdrop sections, such as a main section 114 above the platform 108 and a lower backdrop 320 under the platform 108, other techniques may be used to provide smooth illumination at the intersection of the platform 108 with the supporting ring 104. In an example, a separate ring of white material may be used to provide increased reflection from the bottom to account for the fact that the platform 108 absorbs some light from the bottom. In other embodiments, a section of the platform 108 may be painted, such as white or grey, to provide a uniform transition in the background illumination between the upper and lower backdrop portions.

Figure 4:
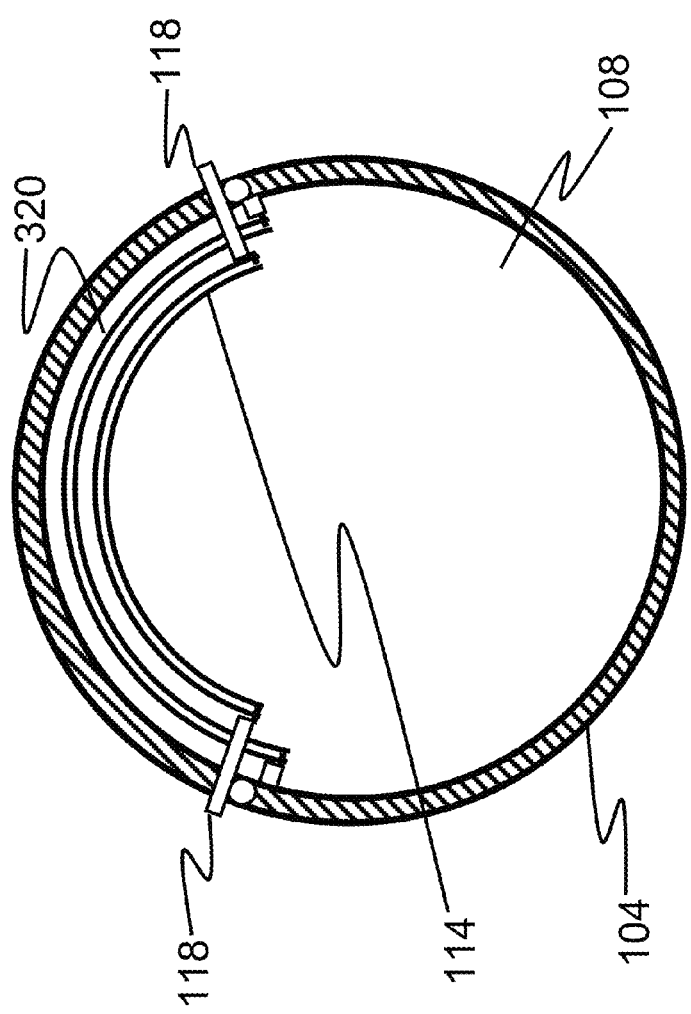
FIG. 4 depicts an overhead view of the image formation facility.

FIG. 4 depicts an overhead view of the image formation facility 302 for purposes of describing an aspect of the invention related to the relative position of the upper backdrop 114 and the lower backdrop 320. FIG. 4 shows the support ring 104 supporting the frame 118 for the diffusion backdrop 114. It also shows the lower diffusion backdrop 320 that is supported by legs 112 (not shown). The support ring 104, lower diffusion backdrop 320, and upper diffusion backdrop 114 are all substantially concentric. The upper diffusion backdrop 114 has the smallest effective diameter and the support ring 104 has the largest diameter. The resulting positioning of the upper backdrop 114 and the lower backdrop 320 may facilitate providing a uniform background to an item 128 being photographed on the image formation facility 302 by ensuring that a top edge of the lower diffusion backdrop 320 is not photographed. This may be accomplished by the upper diffusion backdrop 114 blocking a line of sight between the camera and the top edge of the lower diffusion backdrop 320. A side view of the relative positioning of the backdrops can be seen in FIG. 5 and is described below.

The upper diffusion backdrop 114 and the lower diffusion backdrop 320 may alternatively form non-concentric arcs. In addition, neither backdrop need be concentric with support ring 104. To provide the advantage of ensuring the top edge of the lower diffusion backdrop 320 is not photographed, any arc may be shaped by the backdrops. In an example, lower backdrop 320 may form an elliptical arc and upper backdrop 114 may form a circular arc.

Figure 5:
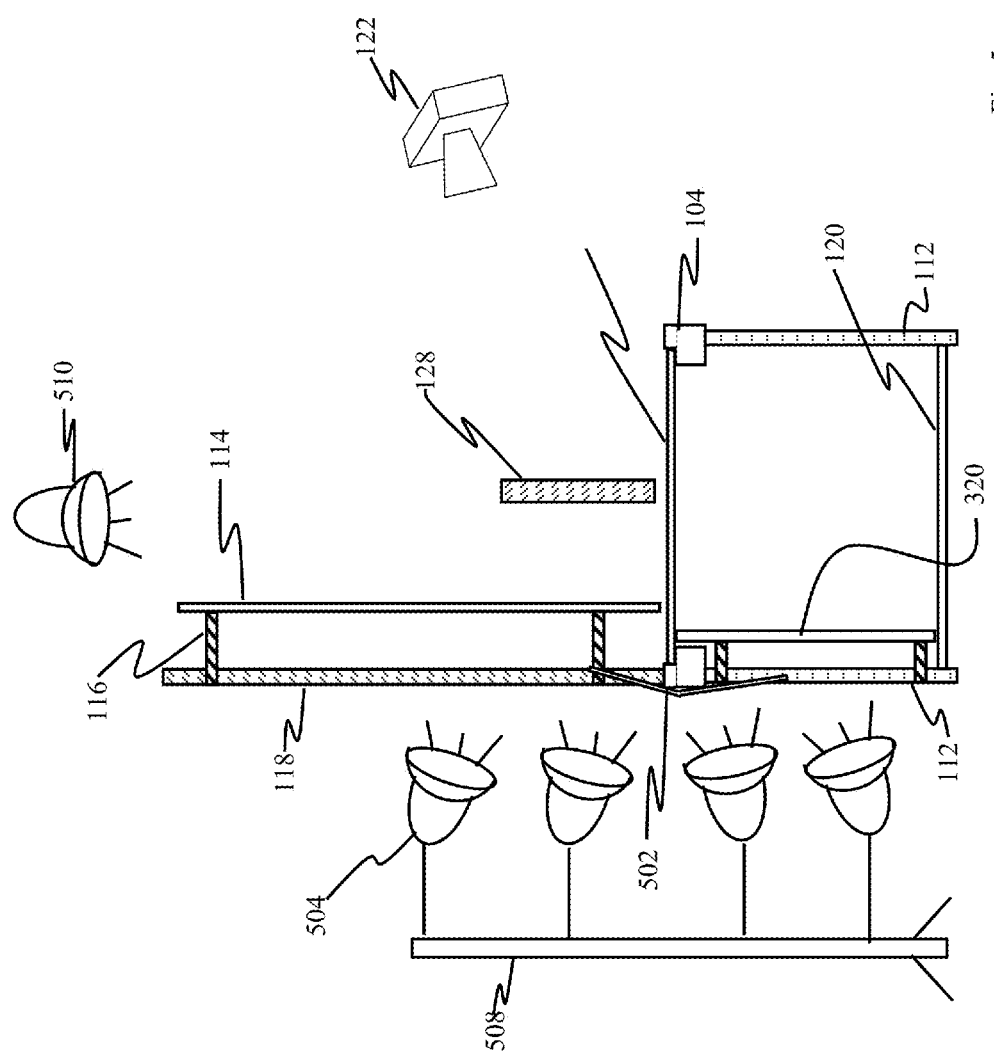
FIG. 5 depicts a section view of the image formation facility.

FIG. 5 depicts a section view of the image formation facility 302 showing a backdrop transition diffusion panel 502 with representative lighting 504 that may be used to illuminate the backdrops. FIG. 5 further includes an overhead light 510 that may illuminate the item 128 on the platform 108. The lighting 504 in combination with diffusion backdrops 114 and 320 and in combination with diffusion panel 502 may facilitate providing a uniform background to an item 128 being photographed. The upper diffusion backdrop 114 is shown mounted offset from the backdrop frame 118 by the frame extensions 116. The frame extensions 116 provide an offset so that the upper backdrop 114 is positioned closer than the lower backdrop 320 to the item 128 being photographed by camera 124.

A diffusion panel 502 may be included with the image formation facility 302 to further facilitate providing a uniform background for the item 128. The diffusion panel 502 may be positioned so that only diffuse light projects onto a portion of the image formation facility 302 that includes the support ring 104, top edge of the lower diffusion backdrop 320 and lower edge of the upper diffusion backdrop 114. This may reduce the amount of reflected light from these elements and from any of the structural elements required to support the backdrops and the platform 108 in this portion of the facility 302. The diffusion panel 502 may be constructed of translucent material much like white office paper, textured plastic, nylon, and other materials that facilitates diffuse transmission of light. The diffusion panel 502 may be mounted to the support ring 104 through a transition bracket or frame similar to the backdrop frame 118.

To provide light to the backdrops, a plurality of lights 504 may be mounted on a light frame 508 behind the image formation facility 302 and directed toward the diffusion backdrops 114 and 320 and the diffusion panel 502. One or more of the lights 504 may be controlled individually or in combination to provide preferred lighting. An overhead light 510 may also be included with the image formation facility 302 to illuminate the item 128 from above. The overhead light 510 may be mounted to an overhead fixture, the ceiling, or to the backdrop frame 118. The overhead light 510 may be individually controlled or controlled in combination with one or more of the lights 504 or the lights 124 to properly illuminate the item 128.

Figure 6:
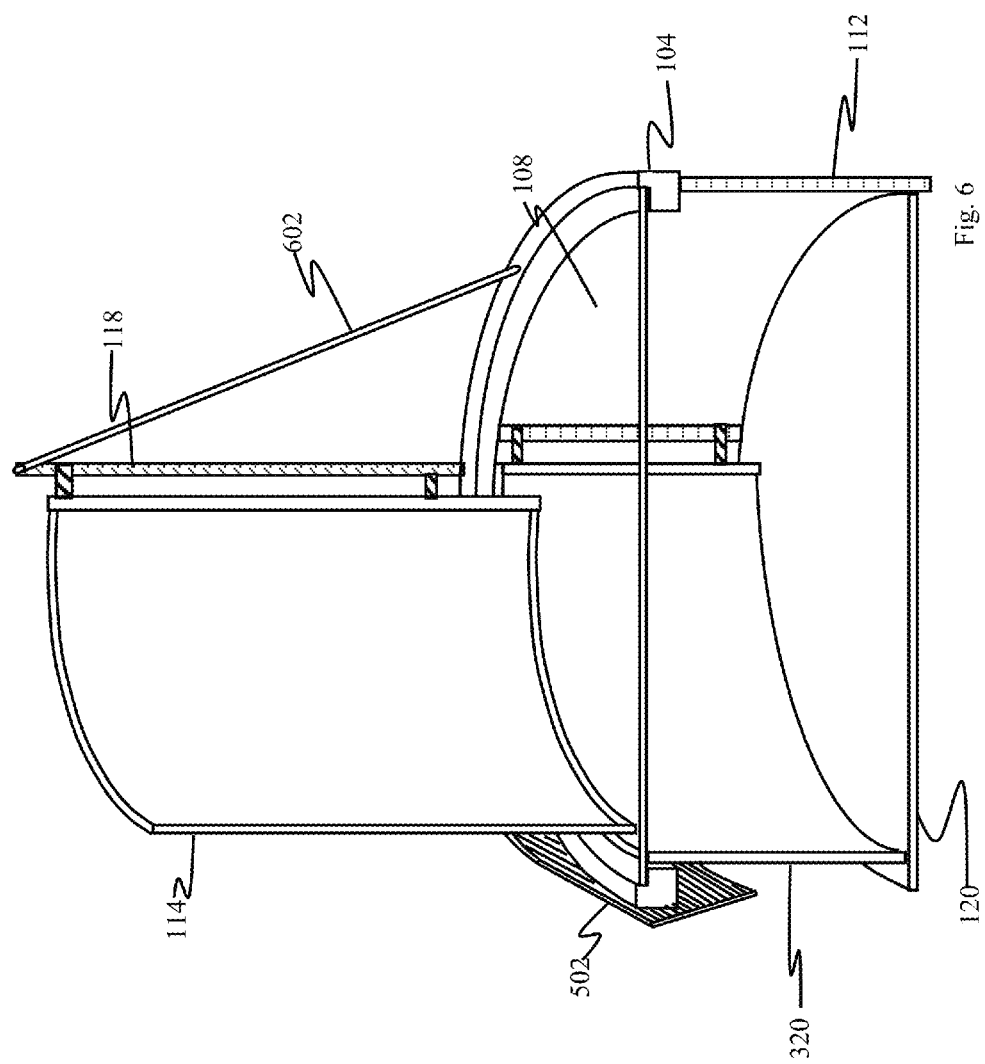
FIG. 6 depicts a perspective cut away view of the image formation facility.

FIG. 6 shows a perspective cut away view of the image formation facility 302 further providing details of the upper backdrop 114, the lower backdrop 320 and the diffusion panel 502. A plurality of upper backdrop stabilization rods 602 may be used to provide stability to the backdrop frame 118. A stabilization rod 602 may be connected between an upper end of the backdrop frame 118 and the support ring 104. The cutaway perspective view of FIG. 6 shows one of the stabilization rods 602 included with the image formation facility 302.

Figure 7:
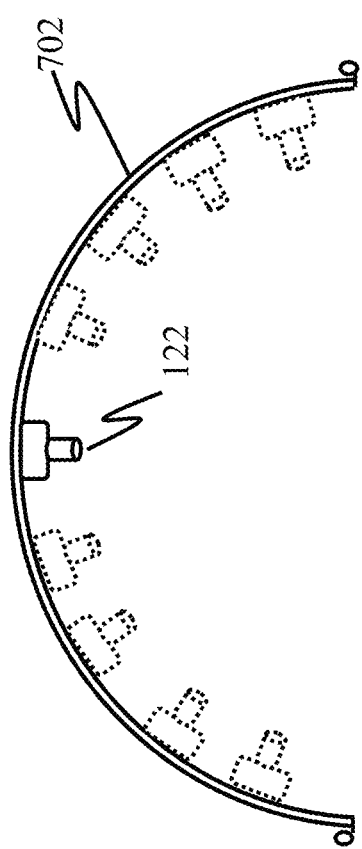
FIG. 7 depicts a front view of a semicircular camera support ring.
Figure 8:
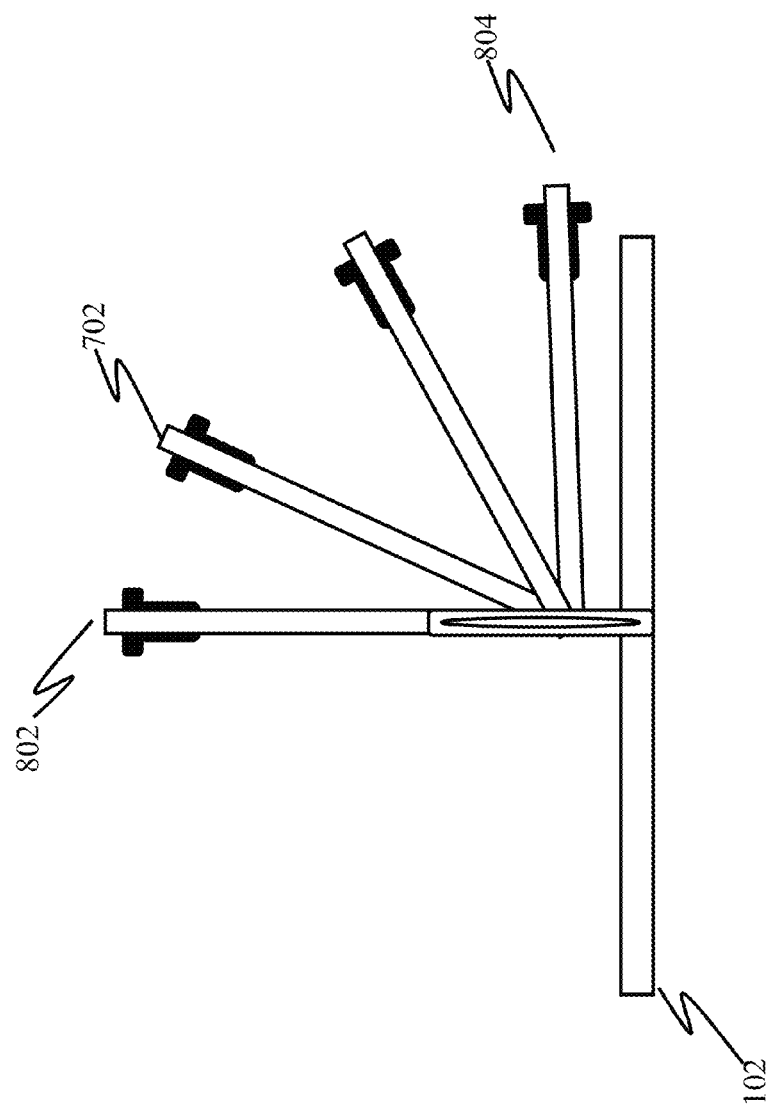
FIG. 8 depicts a side view of the semicircular camera support ring.
Figure 9:
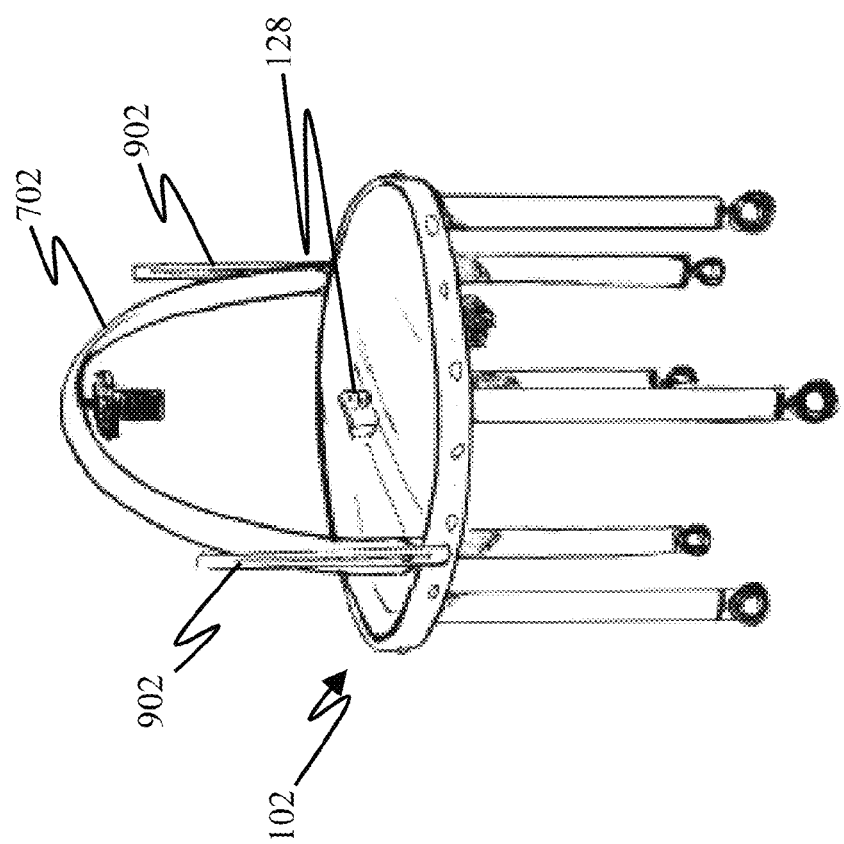
FIG. 9 depicts a perspective view of the semicircular camera support ring with vertical supports.

FIGS. 7 through 9 depict a structure and method for maintaining a constant camera-item distance. In embodiments, the camera 122 may need to be moved about an item 128 while maintaining a constant distance from the item 128, to ensure that images taken as the camera is moved about the item 128 have similar levels of illumination. Maintaining a constant distance may also facilitate generating images that can be sequenced to represent rotating or tilting the object in an interactive user interface display. Thus, a semicircular ring or similar apparatus may be provided that rotates on an axis so that the distance from the camera to the object is maintained, such as when the semicircular ring is rotated to put the camera above the object, alongside the object, or somewhere in between. FIG. 7 depicts an embodiment of the semicircular ring 702. The camera 122 may be slidably attached to the semicircular ring 702 so that the camera 122 can move along the surface of the ring 702 to various positions for acquiring images.

FIG. 8 depicts the semicircular ring 702 and camera 122 mounted to a partial view of an embodiment of the image formation facility 102. The semicircular ring 702 is shown tilting clockwise from an overhead position 802 to a substantially horizontal position 804. When the motion of the camera 122 as shown in FIG. 7 and the motion of the semicircular ring 702 are combined, the item can be viewed from all positions in the quarter-sphere generated by combined motion. In embodiments, the semicircular ring 702 may be tilted counterclockwise as well as clockwise, thereby facilitating capture images of the item 128 from all camera perspectives in the hemisphere above the platform 108.

FIG. 9 depicts a perspective view of the semicircular ring 702 and camera 122 mounted to an embodiment of the image formation facility 102. The semicircular ring 702 is slidably mounted to vertical supports 902 to facilitate placing the camera at a variety of distances from the item 128.

In embodiments, the position of the semicircular ring 702 and the position of the camera 122 on the ring 702 may be automatically detected and transmitted to the image processor 130 so that the three-dimensional position of the camera may be associated with each image acquired. The image database 132 may receive the camera 122 position information along with each image to maintain the camera-item position association. This may facilitate automatically generating sequences of images to depict types of motion of the item such as rotating, tilting, turning, and the like. The three-dimensional camera position may also be used to facilitate identifying the specific image to display on the user interface display 134 in response to a user requesting an alternate view of the item 128.

In embodiments, the camera motion along the semicircular ring 702 and the movement of the ring 702 may be automatically controlled by the image processor 130 or other computing facility to automatically generate a collection of images from various three-dimensional camera positions.

It should be noted that the object described herein could be any kind of object, including a person or other animate object. In embodiments, the image formation facility 302 may safely support a person on the platform 108 for purposes of acquiring images of the person. In general, acquiring images of inanimate objects do not need to take into consideration object movement. However, when acquiring images of a person, people, or other animate objects, such movement must be considered in generating a useful image. In an example, the time between the at least two images used to form an item-only image must be so that the effect on the images of movement of the person, people, or other animate object may be minimized. Cameras and lighting adapted to support very rapid image acquisition may provide the requisite acquisition requirements. If camera or lighting settings must be changed between images, automation of these changes may be required in addition to the automation of acquiring the images.

Aspects of a person that may provide unique requirements for imaging may include the person's hair. Creating an appropriate image boundary or outline that includes elements as small as a human hair may be facilitated by high resolution imaging and lighting that may provide sharp contrast. Since a person's hair also may move between images, the formation and processing system 100 may compensate for this movement by masking hair so that changes in the hair do not impact generating the item-only image. In one embodiment, the hair of the high contrast image may be replaced by the hair of the detailed image during the generation of the item-only image. Other methods such as image processing, lighting adjustments, masking, and the like for minimizing the impact of hair movement on the resulting item-only image may also be applied.

In embodiments, it may be desirable to use different kinds of light between images, such as using lights of different color temperature, intensity, color or the like between the two images.

Figure 10:
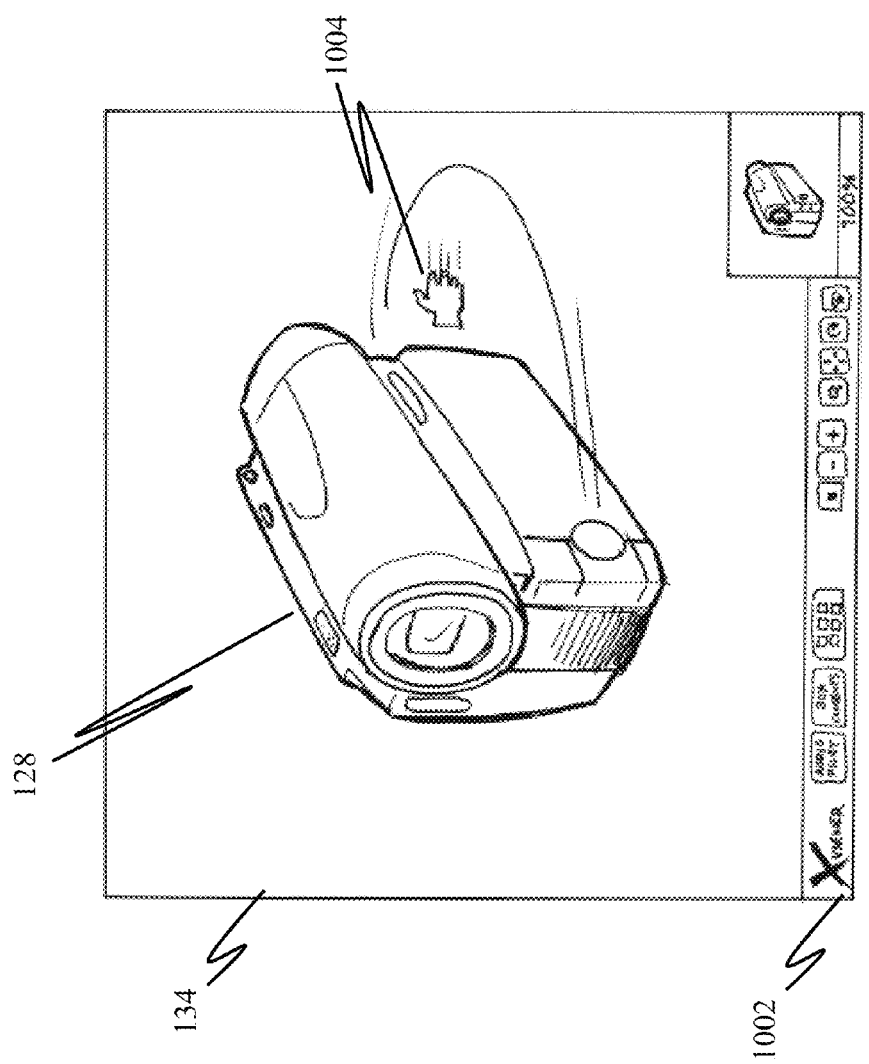
FIG. 10 depicts a view of a user interface display of an image of an item that was photographed with the image formation system.

FIG. 10 depicts an embodiment of the user display 134 that may be included with the image formation and processing system 100. The user display 134 may be used to display images. In embodiments, the images may be images stored in the image library 132, or images acquired by the camera 122, repurposed images, images combined with other graphics or text, web pages containing the images, videos comprising the images, or any combination thereof. The user display 134 may include a user interface 1002 with features adapted to facilitate a user viewing an item 128 from a variety of perspectives, angles, operating modes, stages of unpacking, setup and initialization, and other ways of viewing an item 128. The user display 134 may be used to display images depicting activating item controls, observing item visual display features, reviewing item manuals or assembly instructions, displaying video for assembly or operation, and such other images that may facilitate informing, entertaining, or otherwise satisfying a user preference.

The user interface 1002 of the user display 134 may include a user controlled icon or functional pointer that may depict a human hand, such as hand icon 1004. The hand icon 1004 may be adapted to perform functions equivalent to touching the displayed item 128, gripping and turning the item 128, opening a compartment of the item 128, depressing a control/button of the item 128 (e.g. with a finger or thumb), and other human-item interactions. In embodiments, the hand icon 1004 may change appearance to further emulate a human-item interaction. In an example, as a user positions the hand icon 1004 over a pushbutton control of the item 128, the hand icon 1004 may depict a human hand prepared to depress the button with a finger or thumb. In another example, when a user positions the hand icon 1004 near a dial of the item 128, the hand icon 1004 may depict a human hand prepared to turn the dial. User actions through the user interface 1002 such as clicking a button on a mouse may result in the hand icon 1004 depressing the push button or gripping the dial and subsequent movement of the mouse may turn the dial.

In embodiments the hand icon 1004 may be configured to move or rotate an image of an object. The image may be placed on a grid, such as with cells numbered or lettered to identify particular portions of the screen. A sequence of movements of the hand icon 1004 may be defined, such as using a script, such as indicating where the hand icon 1004 should be placed on the image (e.g., cell A5) and what action should be undertaken by the hand icon 1004 in the interface (e.g., "move to cell A8", "rotate ninety degrees to the left," zoom in to one hundred fifty percent of current image size," or the like). Thus, the hand icon 1004 may be used by an editor to associate a series of movements of the image on the grid to provide a sequence of different images, such as for a presentation of a product.

In embodiments, the image of the item 128 displayed on the user display 134 may change in response to a user action. For example, a user turning a channel select dial on an image of a radio may cause a channel display on the item 128 to change value thereby representing the response of the radio to a user turning a channel select dial. The change in value of the channel display may be accomplished through updating the user display 134 with a sequence of new images of the item 128 from the image library 132.

These and other user-item interactions may be similarly depicted on the user display 134 so that a user may get a feel for the item 128 as if the user were able to physically interact with the item 128. In embodiments, the hand icon 1004 may change shape and size in order to mimic the look of a real hand moving a product.

Figure 11:
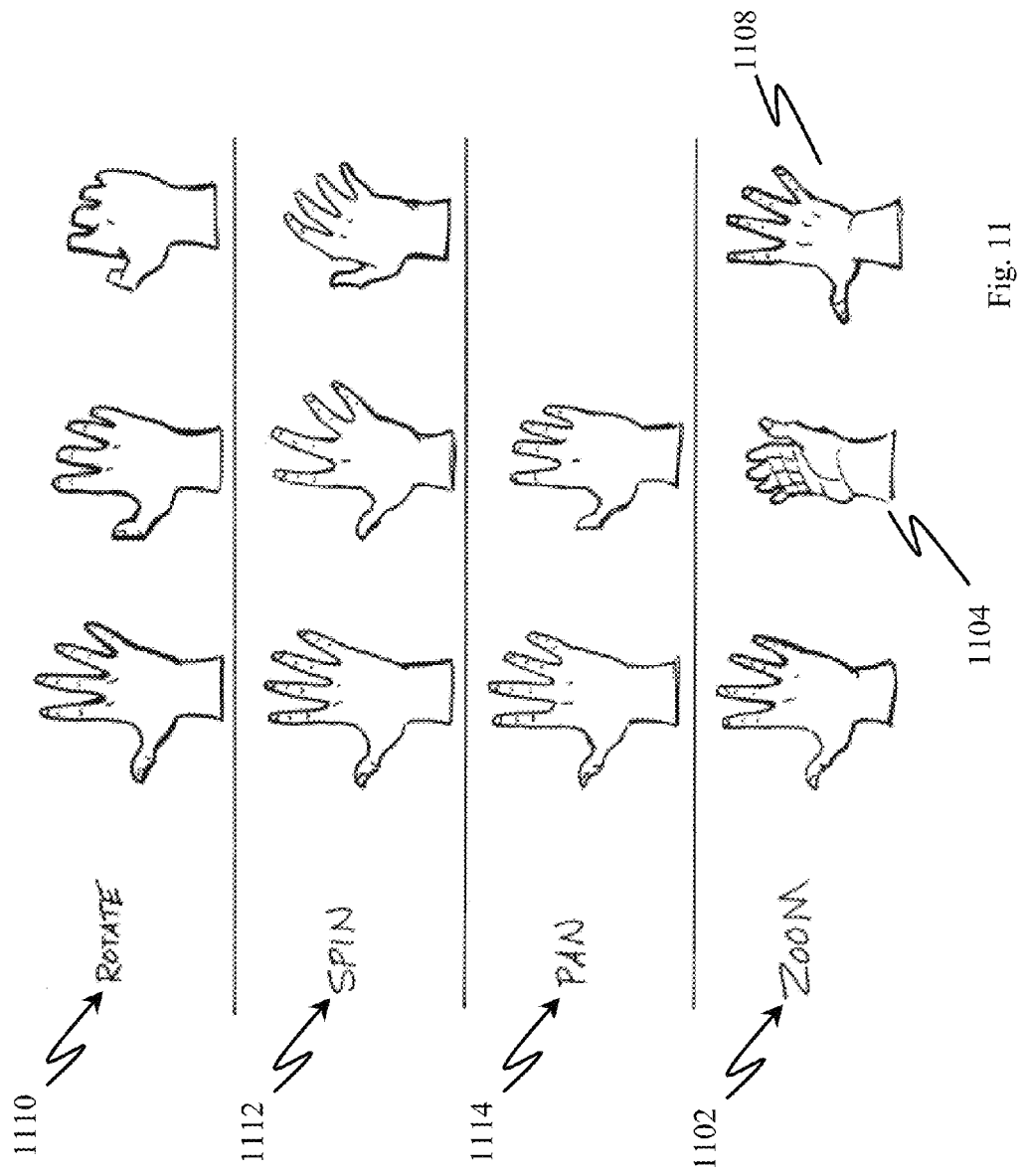
FIG. 11 depicts various representations of a hand icon that may be used to manipulate images displayed in the user interface display.

FIG. 11 depicts various changes of the hand icon 1004 for performing additional human-item interactions. In addition to the types of hand icon 1004 changes already described herein, the hand icon 1004 may further include images of a human hand for performing at least the following: zoom functions 1102 such as zoom in by pulling 1104 toward the user to magnify the item 128, and zoom out by pushing 1108 away from the user to de-magnify the item 128; rotation 1110 by gripping and turning to rotate the item 128; spinning 1112 such as to spin a dial or wheel of the item 128; and panning 1114 to move the item 128 horizontally or vertically in the user display 134.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
    providing a substantially horizontal platform for supporting an item to be photographed, the platform:
        comprising a translucent material, and
        being rotatably supported by a stationary frame;
    providing a multi-section light diffusing panel mounted on the frame, the panel forming a vertically elongated backdrop extending from above the horizontal platform interior to below the horizontal platform interior, a first section disposed substantially above the interior and a second section disposed substantially below the interior;
    illuminating the panel opposite the item to provide a substantially uniform background for the item, thereby forming a silhouette of the item when viewed from a first perspective; and
    capturing an image of the item and the background from the first perspective, such that the captured image comprises an item silhouette that determines the boundary of the item.

2. The method of claim 1, further comprising placing the item on the platform and acquiring an image of the item.

3. The method of claim 2, further comprising acquiring a plurality of images of the item, the plurality of the images collectively comprising a video of the image.

4. The method of claim 2, further comprising identifying and removing an image defect from the image.

5. The method of claim 2, further comprising identifying an item portion and a background portion of the acquired image.

6. The method of claim 1, further comprising processing the captured image to detect a separation between the silhouette and the background, thereby providing an edge mask of the item.

7. The method of claim 6, further comprising removing a background portion of the image, thereby producing an item-only image.

8. The method of claim 7, wherein removing the background portion of the image comprises aligning the edge mask to the image silhouette.

9. The method of claim 7, wherein removing the background portion of the image comprises keeping only the image content contained within the edge mask.

10. A system comprising:
  a substantially horizontal platform having an interior for supporting an item to be photographed on the interior, the platform:
    comprising a translucent material, and
    being rotatably supported by a stationary frame;
  a background light source;
  a multi-section light diffusing panel mounted on the frame, the panel forming a vertically elongated backdrop extending from above the horizontal platform interior to below the horizontal platform interior, a first section disposed substantially above the interior and a second section disposed substantially below the interior, and the panel being positioned between the background light source and the interior of the platform forming a substantially uniform illuminated backdrop for the item;
  a camera disposed to capture an image of a portion of the platform and the backdrop, such that the captured image comprises a silhouette of the item that determines the boundary of the item.

11. The system of claim 10, further comprising an ambient light source for uniformly illuminating the platform.

12. The system of claim 11, in which at least one of the ambient light source and the background light source have controllable brightness.

13. The system of claim 10, further the camera in data communication with an image processor.

14. The system of claim 13, in which the image processor is configured to apply an edge mask to the silhouette image acquired by the camera.

15. The system of claim 13, in which the image processor is configured to identify an item portion and a background portion of an image acquired by the camera.

16. The system of claim 15, in which the image processor is further configured to remove the background portion, thereby producing an item-only image.

17. The system of claim 13, in which the camera is a high resolution camera.

18. The system of claim 13, in which the camera is a video camera.

19. The system of claim 13, in which the camera is operable to receive configuration settings prior to acquiring an image.

20. The system of claim 13, in which the image processor is configured to remove a defect from an image acquired by the camera.

* * * * *

UNITED STATES PATENT AND TRADEMARK OFFICE
CERTIFICATE OF CORRECTION

| | | |
|---|---|---|
| PATENT NO. | : 9,014,476 B2 | Page 1 of 1 |
| APPLICATION NO. | : 14/106119 | |
| DATED | : April 21, 2015 | |
| INVENTOR(S) | : Matthew J. Wheeler, Steven R. Koontz and Robert C. Williams | |

It is certified that error appears in the above-identified patent and that said Letters Patent is hereby corrected as shown below:

In the SPECIFICATION:

column 4, line 55, delete "software" and insert -- software. --;

column 5, line 13, delete "masked" and insert -- masked. --;

column 6, line 37, delete "facility." and insert -- facility; --;

column 12, line 48, delete "Vivatar" and insert -- Vivitar --;

column 15, line 14, delete "Joilet," and insert -- Joliet, --.

Signed and Sealed this
Twentieth Day of October, 2015

Michelle K. Lee
*Director of the United States Patent and Trademark Office*